Jan. 20, 1970  B. C. STICKLEY  3,490,136
METHOD OF ASSEMBLING ONE OBJECT WITHIN ANOTHER
Filed May 5, 1965  2 Sheets-Sheet 1

INVENTOR.
BERYL C. STICKLEY
BY W. J. Shanley, Jr.
HIS ATTORNEY

Jan. 20, 1970    B. C. STICKLEY    3,490,136
METHOD OF ASSEMBLING ONE OBJECT WITHIN ANOTHER
Filed May 5, 1965    2 Sheets-Sheet 2

INVENTOR.
BERYL C. STICKLEY
BY W. J. Shanley Jr.
HIS ATTORNEY

United States Patent Office 3,490,136
Patented Jan. 20, 1970

3,490,136
METHOD OF ASSEMBLING ONE OBJECT WITHIN ANOTHER
Beryl C. Stickley, Waynesboro, Va., assignor to General Electric Company, a corporation of New York
Filed May 5, 1965, Ser. No. 453,244
Int. Cl. B23p 19/04, 11/00
U.S. Cl. 29—427                3 Claims

ABSTRACT OF THE DISCLOSURE

This application discloses a method of assembling and disassembling one object in frictional engagement within another member by applying a tensile force to an intermediate element to elastically stretch same to permit insertion and removal of said one object in said another object.

---

This invention relates to novel means and method for assembling and securing mating components. More specifically, it relates to a novel method and means for assembling and securing one object within an opening in another object.

It is very common in manufacturing processes for one element to be assembled within another and to be held there by any number of means such as frictional engagement, adhesives, encapsulants, soldering or welding. Some times the space available in the outer member is so small that there is great difficulty when it is required to position an inner member within the space provided in the outer member. On such occasions it may be necessary to use special mechanical fixtures to insert the inner member. In addition, in most manufacturing processes there is a normal tolerance with respect to sizes which may cause particular problems as, for instance, the use of shims to hold the members secured relative to each other or the inability to fit both the mating objects and the securing material within the space provided.

It is also usually the case when the concentric members are held together by a frictional engagement, it is sometimes very difficult to remove the inner member in the event it is desired to replace one or the other of the members. In addition, where the engagement is maintained by virtue of the frictional force between the surface of the two members it is usually not possible to provide any degree of mechanical insulation between the two to protect against damage due to shock and vibration.

In this latter respect particular application for the novel method and apparatus of this invention may lie in its use in assembling switch elements such as reed switches sealed in a capsule usually of glass or some other fragile material within the cylinder of a coil bobbin. The assembled device constitutes a reed relay wherein the reed switch elements within the glass capsule would be actuated by the energization of the coil wound on the bobbin. Such assemblies normally have many of the problems which were the subject of the preceding discussion and it has been found that the novel method and apparatus which are the subject of this invention greatly facilitate their manufacture in a number of ways. One particular advantage gained by use of this invention, an advantage which flows from the ability of the parts to be disassembled if that becomes desirable, is that if the reed capsule fails it may be removed from the coil bobbin and replaced by a new reed capsule. This affords obvious advantages both to the manufacturer and the user of such devices.

Frequently it is necessary to provide special tooling in the form of jigs and fixtures when assembling one part within another particularly when the parts are relatively small. Consequently, a measurable capital investment may be required when commencing the manufacture of such parts. To the extent such an investment can be minimized or eliminated a decided advantage results.

Thus, it may be seen that there could be a distinct advantage in the manufacturing processes of a number of different kinds of devices which are required to be assembled one within the other if some relatively simple means of assembling them and holding them together could be provided.

Therefore, it is an object of this invention to provide a novel method and apparatus for assembling one object within another.

It is another object of this invention to provide a novel method and apparatus for assembling one object within the other which may accommodate a considerable variation in size tolerances.

It is still a further object of this invention to provide a novel method and apparatus for assembling one object within another which would permit the inner object to be removed in a convenient manner.

A still further object of this invention is to provide a novel method for the assembly of one object within another wherein an element used in the assembly may also be used to secure the two objects relative to each other.

It is another object of this invention to provide a novel method and apparatus for assembling one object within another which may be used to so assemble objects even though one of the objects may have a surface irregularity or discontinuity.

It is still another object of this invention to provide a novel method of assembling one part within another which does not require relatively expensive tooling in order to carry out the method.

Briefly, in order to accomplish the above objects, this invention, in one form, contemplates the provision of an elastic band or strip which may be passed through the hole in an annular member such as a cylinder into which another element is to be mounted. The other object may then be positioned with a portion of the band extending through one side of the hole and that portion secured by any suitable means and a force applied to the band so that the thickness of the band is reduced. The outer object or annular means may then be slid over the other object. The force may then be released so that the two objects are then assembled one within the other with a portion of the band which has now expanded toward the original thickness holding them in their assembled position. In another aspect of the invention when it is desired to disassemble the two objects a force may be applied to a portion of the band reducing its thickness and the two objects disassembled.

While the specification concludes with claims particularly pointing out and distinctly claiming the subject matter which I regard as my invention, it is believed the invention will be better understood from the following description taken in connection with the accompanying drawings in which:

Figure 1:
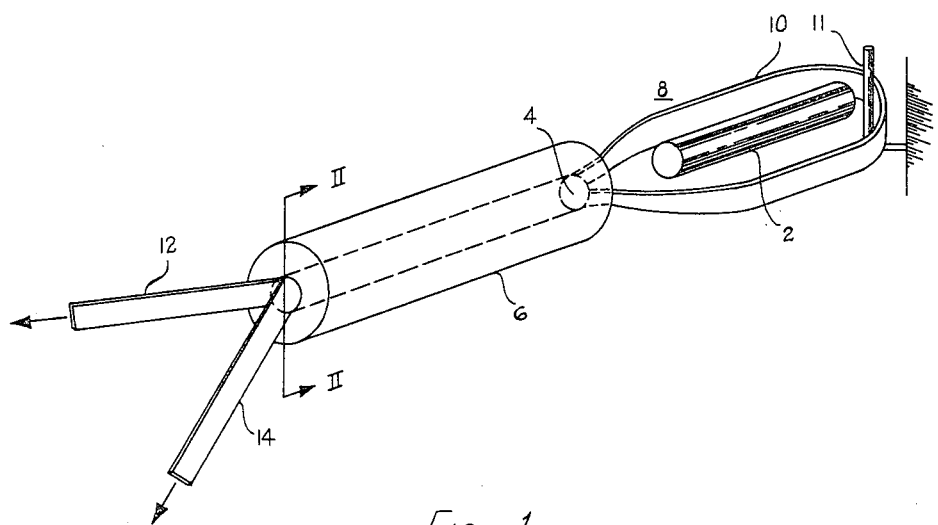
FIG. 1 is an illustration of an embodiment of the invention at an intermediate stage of assembly.

Referring now to FIG. 1, the method and the apparatus of the invention may be appreciated as having proceeded beyond the first steps thereof. Thus, it is understood that it is desired to assemble a first object 2 within an opening or hole 4 formed in another object 6. It has been indicated that this kind of operation is used, for instance, when it is desired to assemble reed switch capsules within the cylindrical bobbins on which energization coils have been wound. Thus, the first object 2 may be constituted by such a reed switch while the cylindrical object 6 may be a coil structure constituted by a bobbin having an opening 4 on which an energizing coil has been wound.

When it is desired to assemble members such as these a number of problems may be encountered. Thus, the tolerances which apply to the diameter or thickness of the first object 2 and the diameter of the opening 4 may be such that a considerable variation in actual sizes is encountered. In addition, it is very frequently desirable both in the manufacturing process, and subsequently, to remove the reed switch capsule from the coil bobbin because one or the other has become damaged or failed in some way, and there would be considerable economic advantage in being able to continue to use one while merely replacing the other. If the reed switch capsule has been assembled within the coil bobbin and secured thereto by an adhesive or encapsulant or some other not easily removable securing element it is very difficult, if not impossible, to achieve this economy of manufacture and use.

The foregoing discussion, while directed to some of the problems in the manufacture and use of reed switch capsules, is intended merely to illustrate such problems in a particular art. It can be appreciated that similar problems can manifest themselves in other sectors of manufacturing when one of the steps includes the assembly of one object within an opening provided in another. The opening need not be in an annular or cylindrical construction for this is shown merely for purposes of illustration. Thus, the opening could be a wall of any thickness and it may be desired to position an element such as a bearing or boss within the opening. Therefore, it should be understood that the words objects and openings are not to be given any limited interpretation as to what the objects might be or as to what form the openings might have.

Referring again to FIG. 1, and continuing with the illustrative example, in order to assemble the first object 2 within the opening 4 in the cylindrical object 6, the invention contemplates the insertion of an elastic element 8 through the opening 4. The elastic element may take the form of a band or strip of natural or artificial rubber, or any other material which would exhibit the quality of permitting elongation and resistance to tear, to permit stretching until the cross-sectional area, when stretched, decreases appreciably.

Figure 2:
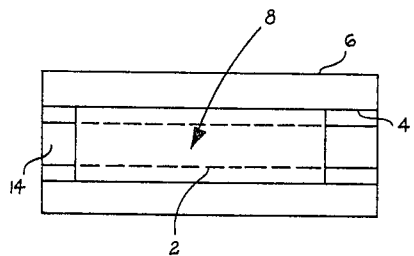
FIG. 2 is a sectional view along the line II—II of an embodiment of the invention at a later stage of assembly.

The element 8 has been inserted through the opening 4 by any suitable means. This could be a stiff hooked tool into the hook of which a loop 10 of the element 8 has been inserted. When the element 8 has been inserted through the hole 4 so that the looped end thereof is sufficiently large to accommodate the object 2, the object 2 is then positioned so as to be encompassed by the portion including the loop 10. The looped end 10 is secured against movement by any suitable means, for instance, a simple hook 11 held on a fixed bracket and a pair of free ends 12 and 14 of the element 8 are subjected to a force as indicated by the arrows to cause the element 8 to be stretched and its thickness reduced. The cylindrical object 6 is then slid over the object 2. When the cylindrical object 6 is properly positioned around the object 2 the force on the free ends 12 and 14 of the element 8 is relaxed so that the element 8 tends to assume its normal thickness. The dimension of the element 8 with respect to the dimensions of the objects 2 and 6 are arranged to be such that when the element 8 is permitted to move back toward its normal thickness it will not completely do so but instead will exert a force on the object 2 and the object 6 so that these two objects will be held fixed with respect to each other. As may be seen in FIG. 2, the objects 2 and 6 are then assembled to each other. By this means the objects 2 and 6 are held in assembled relation without the necessity of any adhesive, encapsulant, soldering or other mechanical securing means.

The element or elastic band 8 may then be cut with any suitable means. The act of cutting will leave the element 8 with a pair of free ends in addition to those free ends 12 and 14 already discussed which may also be cut to a suitable length.

If the circumstance should arise where it is desirable or necessary to remove the object 2 from the object 6 a force may again be applied to the free ends of the element 8 causing the element 8 to again be reduced in thickness so that the object 2 may be removed from the object 6.

As an alternative it is possible to use the invention in such a way as to make difficult, if not impossible, the disassembly of parts such as 2 and 6. In this mode, the invention is carried out as before up to the point where the elastic band 8 and the free ends 12 and 14 are to be cut to a suitable length. If a force similar to but of less magnitude than that force required to initially assemble or to subsequently disassemble the objects 2 and 6 is now applied to each free end of elements 8, 12, and 14, and each element is cut as close as practical to the assembled objects 2 and 6, the free ends 8, 12 and 14 will tend to resume their normal length and thickness after cutting and the uncut ends will move well inside the opening 4 so that it will no longer be easily accessible, if accessible at all, to be grasped. Thus, it should not be possible to grasp the free ends of the elements 8, 12 and 14 so as to apply a force thereto in order to stretch the elements 8, 12 and 14 reducing their cross-sectional area and consequently the force holding the objects 2 and 6 together.

It is possible that the dimensions of objects such as 2 and 6 are such that it would not be possible to provide two thicknesses of an element 8 between them. If this is the case then the element 8 may take the form of a band or strip having no loop but which is inserted through the opening 4 in the object 6 and one end thereof is secured as by clamping. The object 2 may be positioned adjacent the element 8, a force applied to the free end of the element and when the element is stretched sufficiently so as to reduce its thickness the desired amount the object 6 is then slid over the object 2. The force may then be removed permitting the element 8 to resume its normal thickness.

It should be noted that it is not necessary for the objects as typified by 2 and 6 to be circular in cross section. Thus, they could just as well be irregular or rectangular. If the object 2 had some surface irregularity such as a protuberance thereon it need only be necessary that the opening in the object 6 be of such a shape so as to accommodate the irregularity.

Figure 3:
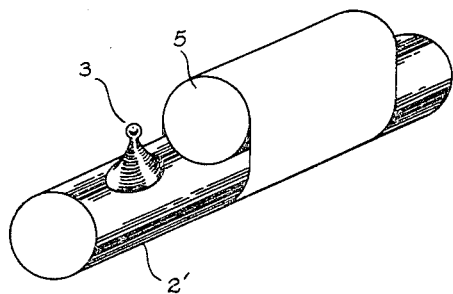
FIG. 3 is an exploded view showing how an object having a fragile portion may be protected in order to effect its assembly.

FIG. 3 of the drawing illustrates how an object 2' having a protuberance 3 thereon can be accommodated in order to effect its assembly with another object such as 6. Thus, if the protuberance 3 is a relatively fragile element, a protective element such as shown at 5 can be shaped from any suitable material to encompass the protuberance or to lie immediately adjacent to and project higher than the protuberance. In this manner the force exerted by the holding element when the object 2' is positioned within the accommodating opening in the object 6 is applied to the protective element 5 and not directly to the protuberance 3.

Figure 4:
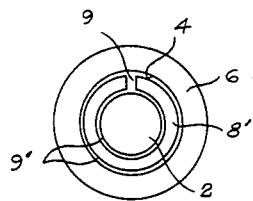
FIG. 4 is a view partially in cross section of another embodiment of the invention.
Figure 5:
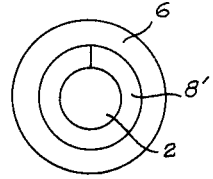
FIG. 5 is a view similar to FIG. 4 where the assembly has been completed.

FIGS. 4 and 5 illustrate still another embodiment of the invention. In this form the elastic member 8' is designed as a wide band of such a width as to more than encompass the object 2 when the band is in its relaxed state. In FIG. 4 the member 8' has been passed through the opening 4 and a force applied thereto so that it is under tension. As stated above, the effect of the tension force causes the members 8' to be elongated and its cross-sectional area reduced. Thus, not only is the thickness of the band reduced but its width is also so that there is a gap 9 between the longitudinal sides of the member 8', as well as space 9' between the element and the objects 2 and 6. As may be seen in FIG. 4, the member 8' has been dimensioned so that its width when stretched almost equals the circumference of the object 2. In FIG. 5 the force on the member 8' has been removed and it has tended to resume its normal thickness to occupy the space 9' exerting a holding force on the objects 2 and 6. In addition since the width tended to assume its normal dimension as did the thickness, the gap 9 has been occupied by the relaxed member 8. But since the gap 9 permitted only partial recovery in width, the element 8' becomes compressed in width which results in the element 8' tending to become thicker in the assembled state than it was in the original relaxed state. The resulting structure is one which provides maximum accommodation of tolerances and uniform cushioning all around the object 2.

While I have shown and described my invention in various aspects it will of course be understood that I do not wish it to be limited thereto for it will be clear that variations of the general arrangement and of the details of construction which are specifically illustrated and described may be resorted to without departing from the true spirit and scope of the invention as defined in the appended claims.

What I claim as new and desire to secure by Letters Patent of the United States is:

1. The method of assembling one object within another comprising the steps of inserting an elongated elastic member through an opening in the object within which the other object is to be assembled, positioning the other object within a loop of the member extending through one side of the opening, applying a tensile force to said member to elastically stretch and reduce the cross-sectional area of said member to permit the positioning of the other object into the opening in the one object, moving the objects with respect to each other so as to position said other object within said opening while the member is stretched by said tensile force, and releasing the force on said member so that a portion of the member will exert a holding force on the objects.

2. The method of claim 1 wherein the step of inserting said elongated member through the opening is accomplished by inserting a looped end of such member through the opening so that the looped end extends through one side of the opening and the other end extends through the other side of the opening, and means wherein the tensile force is developed by pulling on the other end of the member.

3. The method of first assembling and later disassembling one object within the other comprising the steps of inserting a looped end of an elongated elastic band through an opening in the object within which the other object is to be assembled, positioning the other object within the loop of the looped end pulling on the free ends of the band to produce a tensile force which elastically stretches and reduces the cross-sectional area of the band and moving the objects with respect to each other so as to position said other object within said opening while the band is stretched by said tensile force, releasing the force on said band so that a portion of the band will exert a holding force on the objects to complete the assembly and subsequently applying tensile force to said band to release the other object from the opening when it is desired to disassemble the other object.

References Cited

UNITED STATES PATENTS

| | | | |
|---|---|---|---|
| 2,097,318 | 10/1937 | Dowell. | |
| 3,208,168 | 9/1965 | Henschen. | |
| 1,721,155 | 7/1929 | Johnson. | |
| 2,252,299 | 8/1941 | McCoy. | |
| 2,419,683 | 4/1947 | Henschke | 29—235 X |
| 2,639,496 | 5/1953 | Hartzell | 29—451 |
| 3,127,672 | 4/1964 | Kretschmer | 29—450 |
| 3,176,388 | 4/1965 | Dutton | 29—450 |
| 2,957,961 | 10/1960 | Juptner | 200—87 |
| 3,167,625 | 1/1965 | Russo | 200—87 |

CHARLIE T. MOON, Primary Examiner

U.S. Cl. X.R.

29—451, 453; 64—11; 200—87